United States Patent [19]

Matsuo et al.

[11] Patent Number: 4,914,141
[45] Date of Patent: Apr. 3, 1990

[54] ANTIFOULING PAINT CONTAINING POLYMER OF ETHYLENICALLY UNSATURATED ORGANOTIN MONOMER

[75] Inventors: Toshiaki Matsuo, Kyoto; Hiroshi Doi, Hyogo, both of Japan

[73] Assignee: Nippon Oil and Fats, Co., Ltd., Tokyo, Japan

[21] Appl. No.: 125,802

[22] Filed: Nov. 19, 1987

Related U.S. Application Data

[63] Continuation of Ser. No. 687,338, Dec. 28, 1984, abandoned.

[30] Foreign Application Priority Data

Dec. 30, 1983 [JP] Japan .................. 58-250726

[51] Int. Cl.$^4$ .................................... C08J 3/00
[52] U.S. Cl. ..................... 523/122; 526/240
[58] Field of Search ............. 526/240; 523/122

[56] References Cited

U.S. PATENT DOCUMENTS 4,532,269  7/1985  Gitlitz et al. ............ 526/240

FOREIGN PATENT DOCUMENTS

| 21426 | 3/1965 | Japan . |
|---|---|---|
| 57-67672 | 2/1981 | Japan . |
| 102961 | 1/1982 | Japan . |
| 2087415B | 5/1975 | United Kingdom . |
| 1062324 | 11/1979 | United Kingdom . |

*Primary Examiner*—Harold D. Anderson
*Attorney, Agent, or Firm*—Sughrue, Mion, Zinn, Macpeak & Seas

[57] ABSTRACT

An antifouling paint which containing as a vehicle a copolymer comprising units (a) and (b)

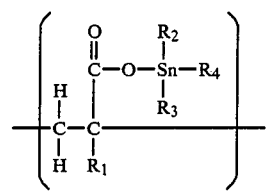

wherein $R_1$ represents a hydrogen atom or a methyl group, and $R_2$, $R_3$, and $R_4$ each represents an alkyl group having from 1 to 8 carbon atoms or a phenyl group;

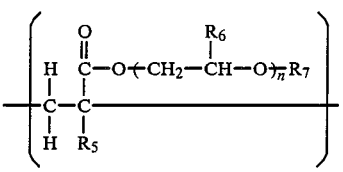

wherein $R_5$ and $R_6$ each represents hydrogen atom or a methyl group, $R_7$ represents an alkyl group having from 1 to 4 carbon atoms or an acyl group, and n is a positive number from 1 to 30, wherein the total weight of unit (b) per molecule is at least 5 wt %, and said paint further contains from 0 to 80 wt % of a non-polymeric antifouling agent.

10 Claims, No Drawings

ANTIFOULING PAINT CONTAINING POLYMER OF ETHYLENICALLY UNSATURATED ORGANOTIN MONOMER

This is a continuation of application Ser. No. 687,338, filed 12/28/84, now abandoned.

FIELD OF THE INVENTION

The present invention relates to an antifouling paint for controlling and minimizing the attachment and growth of marine fouling organisms to those parts of various objects which are submerged in seawater.

BACKGROUND OF THE INVENTION

The attachment and growth of marine fouling organisms (e.g., barnacles, mytilus, ascidian, bryozoa, tube worms, sea lettuce, and green layer) to ships, marine structures, fishing nets and cooling seawater intake lines in power generating plants cause various problems such as reduced ship speed, increased fuel consumption, mass death of fish due to poor flowing of seawater caused by the clogging of net meshes, and corrosion of structural members. Various antifouling paints are in current use for controlling the attachment and growth of marine fouling organisms.

Antifouling paints of the so-called self-polishing type are known; they release the antifouling agent into seawater while the paint film gradually dissolves into the seawater so as to continuously provide an antifouling property on the film surface. One great advantage of using antifouling paints of the self-polishing type as ship bottom paints is that even if they are unevenly applied to ship bottoms, the roughness of the coating surface is gradually decreased in the seawater, thus reducing ship-drag. Repair coating of a vessel at each dry-docking result in a thicker residual paint film, and this also causes increased surface roughness of the coating; this problem can also be avoided by antifouling paints of the self-polishing type, and any possible increase in ship-drag is prevented.

Prior art antifouling paints of the self-polishing type are described in Japanese Patent Publication Nos. 21426/1965 and 9579/1969. These paints contain a homopolymer of an organotin compound of the formula

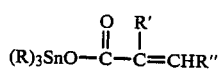

or a copolymer of such compound with another unsaturated monomer. These polymers are gradually hydrolyzed in weakly alkaline seawater to release a free trialkyl tin compound while carboxyl groups are formed in the polymer. The released trialkyl tin compound works as an antifouling agent to control biofouling.

The carboxyl group in the polymer renders it hydrophilic, and as more carboxyl groups are formed in the polymer due to hydrolysis, the polymer gradually dissolves into the seawater. By this mechanism, antifouling paint of the self-polishing type continuously provides an active exposed surface on the coating, thereby ensuring consistent slow release of the toxin throughout its service life.

The antifouling effect of the free trialkyl tin compound can be supplemented by an additional antifouling agent such as cuprous oxide. Furthermore, the self-dissolving action of the paint film allows the additional antifouling agent to be released at a substantially constant rate, thereby ensuring consistent antifouling effects.

The self-polishing property of the paint film is determined by the amount of trialkyl tin ester in the polymer, and the necessary self-polishing effect is not obtained unless said ester is present in a fairly large amount. However, organotin compounds having unsaturated groups are quite expensive, and using such compounds in large quantities is not cost effective.

Attempts have been made to introduce free carboxyl groups or hydroxyl groups into the polymer in order to impart self-polishing properties to the paint film without using a large amount of the trialkyl tin ester. However, these hydroxyl groups easily react with metallic antifouling agents such as cuprous oxide at ordinary temperatures, and the resulting cross-linking reaction, occurring in the paint container, produces a gelled paint which is no longer usable. Attempts have also been made to produce polymers with enhanced self-polishing properties by replacing part of the comonomers with relatively hydrophilic monomers such as methyl methacrylate, methyl acrylate and ethyl acrylate However, no satisfactory results have been obtained from such attempts.

SUMMARY OF THE INVENTION

Therefore, the present inventors have made extensive studies with a view to providing an antifouling paint of the self-polishing type that permits free control over the self-polishing properties of the paint film irrespective of the quantity of a trialkyl tin ester in the polymer, and the present invention has now been accomplished as a result of these studies.

Thus the present invention is directed to an antifouling paint containing as a vehicle a copolymer comprising units (a) and (b)

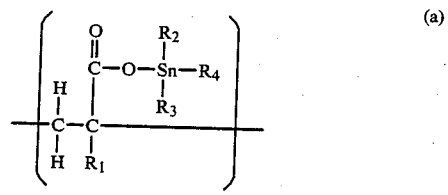

wherein $R_1$ represents a hydrogen atom or a methyl group, and $R_2$, $R_3$, and $R_4$ each represents an alkyl group having from 1 to 8 carbon atoms or a phenyl group; and

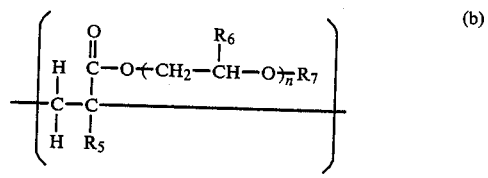

wherein $R_5$ and $R_6$ are each a hydrogen atom or a methyl group, $R_7$ represents an alkyl group having from 1 to 4 carbon atoms or an acyl group, and n is a positive number from 1 to 30, wherein the average total weight of unit (b) per molecule (i.e., monomer weight % of the unit (b) in copolymer) is at least 5 wt %, and said paint further contains from 0 to 80 wt % of a non-polymeric antifouling agent.

DETAILED DESCRIPTION OF THE INVENTION

The copolymer used as a vehicle in the antifouling paint of the present invention is highly hydrophilic since unit (b), as one of the two essential components, contains a hydrophilic alkylene oxide group. When this antifouling paint film is submerged in seawater, the ester group in the other essential component unit (a) hydrolyzes to release a free organotin compound that works as an antifouling agent, whereas carboxyl groups are formed in the copolymer. Because of the presence of unit (b), the copolymer is highly hydrophilic, and therefore easily undergoes hydrolysis. As a result of the formation of carboxyl groups, the copolymer dissolves into the seawater as if it would "polish itself".

According to the present invention, the desired degree of the self-polishing properties of the coating can be obtained by varying the relative proportions of the essential units (a) and (b), as well as a fairly hydrophobic optional constituent hereinafter referred to as unit (c). As a further advantage, a sufficiently high degree of self-polishing properties can be obtained by simply increasing the proportion of unit (b) alone.

If the proportion of unit (a) in the copolymer is low, an additional antifouling agent such as cuprous oxide may be used.

Therefore, according to the antifouling paint of the present invention, a balance can be easily struck between the self-polishing and antifouling effects of the paint film, and as an economical advantage, the adjustment of these effects can be achieved without considering the content of unit (a) in the copolymer.

The copolymer contained as a vehicle for the antifouling paint of the present invention is prepared by copolymerizing a monomer (A) represented by the formula

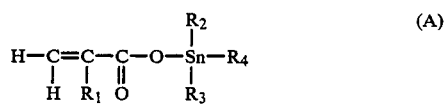

wherein $R_1$, $R_2$, $R_3$ and $R_4$ are each the same as defined above, with a monomer (B) represented by the formula

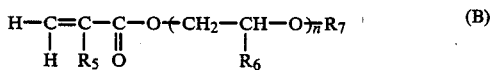

wherein $R_5$, $R_6$, $R_7$ and n are each the same as defined above; optionally, an unsaturated monomer (C) which differs from, but is copolymerizable with, monomers (A) and (B).

Illustrative examples of monomer (A) include the following: tri-n-butyltin methacrylate, tri-n-butyltin acrylate, tricyclohexyltin methacrylate, tricyclohexyltin acrylate, triphenyltin methacrylate, triphenyltin acrylate, tripropyltin methacrylate, tripropyltin acrylate, triisopropyltin methacrylate, triisopropyltin acrylate, tri-sec-butyltin methacrylate, tri-sec-butyltin acrylate, triethyltin methacrylate, triethyltin acrylate, diethylbutyltin methacrylate, diethylbutyltin acrylate, diethylamyltin methacrylate, diethylamyltin acrylate, diamylmethyltin methacrylate, diamylmethyltin acrylate, propylbutylamyltin methacrylate, propylbutylamyltin acrylate, diethylphenyltin methacrylate, diethylphenyltin acrylate, ethyldiphenyltin methacrylate, ethyldiphenyltin acrylate, n-octyldiphenyltin methacrylate, n-octyldiphenyltin acrylate, diethyloctyltin methacrylate and diethyloctyltin acrylate.

Preferred monomers (B) are those wherein $R_7$ represents a methyl group, an ethyl group, or an acyl group. Examples of such preferred monomer (B) are listed below 2-methoxyethyl methacrylate, 2-methoxyethyl acrylate, 2-methoxypropyl methacrylate, 2-methoxypropyl acrylate, methoxytriethyleneglycol methacrylate, methoxytri-ethyleneglycol acrylate, methoxytetraethyleneglycol methacrylate, methoxytetraethyleneglycol acrylate, ethoxy-tripropyleneglycol methacrylate, ethoxytripropyleneglycol acrylate, ethoxyhexaethyleneglycol methacrylate, ethoxyhexaethyleneglycol acrylate, acetoxydiethyleneglycol methacrylate, acetoxydiethyleneglycol acrylate, acetoxynonaethyleneglycol methacrylate, acetoxynonaethyleneglycol acrylate, methoxytricosaethyleneglycol methacrylate and methoxytricosaethyleneglycol acrylate. Among these monomers, those wherein $R_6$ is a hydrogen atom are particularly preferred.

As shown below, monomer (C) is preferably an unsaturated monomer containing no free carboxyl or hydroxyl group. Illustrative examples of such monomer (C) include acrylic compounds such as methyl acrylate, methyl methacrylate, ethyl acrylate, ethyl methacrylate, propyl acrylate, propyl methacrylate, butyl acrylate, butyl methacrylate, isobutyl acrylate, isobutyl methacrylate, 2-ethylhexyl acrylate, cyclohexyl acrylate, cyclohexyl methacrylate, phenyl acrylate, acrylamide and acrylonitrile; vinyl compounds such as vinyl chloride, vinyl butyrate, vinyl acetate, vinylidene chloride, vinyl propionate and vinyl butyl ether; and vinyl hydrocarbons such as ethylene, butadiene, styrene and α-methylstyrene.

The presence of a free carboxyl or hydroxyl group in monomer (C) is not desired, since an additional metallic antifouling agent (e.g., cuprous oxide, tributyltin compound, or triphenyltin compound) incorporated in the paint easily reacts with the free carboxyl or hydroxyl group at ordinary temperatures, and the resulting crosslinking reaction will produce a gelled paint which is no longer serviceable in the paint container.

The preferred proportions of the comonomers (A), (B), and (C) are from 0.1 to 45 wt %, from 5 to 99.9 wt %, and from 0 to 80 wt %, respectively, based on the total weight of the monomers. In order to prepare a copolymer consisting of only the two monomers (A) and (B), from 0.1 to 45 wt % of monomer (A) is copolymerized with from 55 to 99.9 wt % of monomer (B). In a terpolymer consisting of monomers (A), (B) and (C), the preferred composition incorporates monomer (A) in an amount of from 0.1 to 45 wt %, whereas monomer (B) is incorporated in an amount of at least 5 wt %, typically from 5 to 90 wt %, and monomer (C) in an amount of from 5 to 80 wt %, provided that the sum of monomers (B) and (C) is within the range of from 55 to 99.9 wt %.

These monomers are copolymerized by solution polymerization, or emulsion polymerization and other methods of addition polymerization may be employed. Reaction solvents that may be used in solution polymerization are xylene, toluene, propanol, isopropanol, butanol, isobutanol, butyl acetate, ethyl acetate and ethyleneglycol monoethyl ether, and these solvents may be used either alone or in combination. For controlling the degree of polymerization, a chain transfer agent such as dodecyl mercaptan may be used.

In another method of preparing the copolymer according to the present invention, acrylic acid or methacrylic acid instead of monomer (A) is copolymerized as shown above, and the carboxyl group in the resulting copolymer may be esterified with, for example, bis(tributyltin)oxide, bis(triphenyltin)oxide, or triphenyltin hydroxide.

The copolymer prepared as above according to the present invention preferably has a weight average molecular weight of from about 5,000 to 200,000, and more preferably from 10,000 to 100,000. A copolymer having an average molecular weight of less than 5,000 provides a paint film that tends to have too high a self-polishing property and wears at an undesirably fast rate. A copolymer whose average molecular weight exceeds 200,000 provides a paint film that tends to have an undesirably low self-polishing property.

The preferred proportions of the average total weights of the constituent units in one molecule of the copolymer is such that unit (a) is present in a range of from 0.1 to 45 wt %, unit (b) is present in a range of from 5 to 99.9 wt %, and unit (c) is present in a range of from 0 to 80 wt %, provided that the sum of the three units is 100 wt % of the copolymer.

If the copolymer consists of only units (a) and (b), the average total weight of unit (a) per molecule is preferably in the range of from 0.1 to 45 wt % whereas the average total weight of unit (b) per molecule is preferably in the range of from 55 to 99.9 wt % per molecule. In the absence of unit (a), a paint film having the desired self-polishing property is not obtained. Too high a content of unit (a) is economically disadvantageous since this requires excessive use of an expensive organotin compound in order to introduce the unit (a).

If the copolymer consists of not only units (a) and (b) but also unit (c) based on monomer (C), the average total weight of unit (a) per molecule is preferably in the range of from 0.1 to 45 wt %, whereas unit (b) is preferably at least 5 wt %, and more preferably from 5 to 90 wt %, and unit (c) is in the range of from 5 to 80 wt % on the condition that the average total weight per molecule of the sum of units (b) and (c) is in the range of from 55 to 99.9 wt %.

If the terpolymer contains no unit (a), a paint film having the desired self-polishing property is not obtained. Too high a content of unit (a) is also undesired from an economic viewpoint, since this requires excessive use of an expensive organotin compound in introducing the unit (a). If the average total weight per molecule of unit (b) in the terpolymer is less than 5 wt %, the necessary self-polishing property is not obtainable unless a considerably high proportion of unit (a) is used. If the proportion of unit (b) is too high, a paint film which has an undesirably high self-polishing property and wears too fast results. These problems, which occur if a low proportion of unit (a) is compensated by an undesirably high content of unit (b), can be effectively avoided by incorporating unit (c). However, if the proportion of unit (c) is too high, a terpolymer of low hydrophilicity results, and furthermore, the reduced hydrophilicity hinders hydrolysis of the ester group in unit (a), thereby producing a paint film having an undesirably low self-polishing property.

The antifouling paint of the present invention also contains a non-polymeric antifouling agent, examples of which include cuprous oxide, cuprous thiocyanate, zinc oxide, zinc chromate, strontium chromate, cupric chromate, cupric citrate, cupric ferrocyanate, cupric quinolinate, cupric oleate, cupric oxalate, cupric phosphate, cupric tartarate, cuprous bromide, cuprous iodide, cuprous sulfite and copper naphthenate, and these copper or zinc compounds may be used either independently or in mixture. Also usable are organotin antifouling agents such as tributyltin fluoride, tributyltin chloride, tributyltin acetate, tributyltin laurate, tripropyltin chloride, triamyltin acetate, triphenyltin fluoride, triphenyltin nicotinate, triphenyltin sulfide, bistriphenyltin α,α-dibromosuccinate, triphenyltin chloride, triphenyltin versatate, tricyclohexyltin monochloroacetate, bis(tributyltin)oxide, bis(triphenyltin)oxide, bis(tricyclohexyltin)sulfide, bis(tri-2-ethylbutyltin)oxide, and bis(tri-sec-butyltin)oxide. Triazine compounds may also be used, including 2-chloro-4,6-bis(ethylamino)-s-triazine, 2-chloro-4-ethylamino-6-isopropylamino-s-triazine, 2-chloro-4,6-bis(isopropylamino)-s-triazine, 2-methoxy-4,6-bis(ethylamino)-s-triazine, 2-methylthio-4,6-bis(ethylamino)-s-triazine, 2-methylthio-4,6-bis(isopropylamino)-s-triazine, and 2-methylthio-4-ethylamino-6-isopropylamino-s-triazine. Organosulfur compounds such as zinc dimethyl carbamate and tetramethylthiuram disulfide may also be used. These organic antifouling agents may be used either independently or in combination with themselves or with inorganic antifouling agents.

These non-polymeric antifouling agents are used in an amount in the range of from 0 to 80 wt % of the final paint, and a suitable amount may be determined depending upon the antifouling property of the copolymer vehicle. If the copolymer contains a sufficient amount of unit (a) to provide the desired antifouling effect, these nonpolymeric antifouling agents need not be used. If the copolymer contains an insufficient amount of unit (a) to exhibit the desired antifouling effect, it may be supplemented by one or more of these non-polymeric antifouling agents which are used in an amount not exceeding 80 wt % of the paint composition.

As shown above, the antifouling paint of the present invention contains the copolymer as the vehicle and the optional non-polymeric antifouling agent in an amount of up to 80 wt %, depending upon the particular antifouling properties desired of the copolymer. In addition to these components, the paint usually contains a pigment, various additives, and a solvent. Illustrative pigments include inorganic pigments such as titanium dioxide, carbon black, red oxide, talc, barium sulfate, barium carbonate, calcium carbonate, kaolin, silica, magnesium carbonate, alumina and chrome yellow; organic pigments or dyes such as phthalocyanine pigments and azo pigments. Illustrative additives include plasticizers such as dioctyl phthalate, diphenyl phthalate, tributyl phosphate, tricresyl phosphate and chlorinated paraffin, as well as paint additives such as thickeners, dispersants, wetting agents and antisag agents. The additional solvent may be of the same type as that used in solution polymerization for preparing the vehicle copolymer.

A paint may be formulated from the components above by any known technique. In a typical method, a copolymer solution, a non-polymeric antifouling agent, a pigment and other necessary additives are charged into a disperser and premixed. Then, a solvent is added to the mixture to adjust its viscosity in the dispersion to predetermined value. The mixture is further dispersed for from 0.5 to 5 hours either at ordinary temperatures or under heating, until a suitable particle size, which is typically not greater than 100 μm, is obtained. If necessary, a solvent is added to attain the desired viscosity. Finally, any agglomerates or foreign material is filtered off, so as to provide the antifouling paint of the present invention. The proportions of the respective components are not limited to any particular value, and may be properly determined depending upon the specific use of the final paint.

The following examples are provided as a further illustration of the present invention and are not to be construed as limiting. Copolymer solutions A to L used in Examples 1 to 17, which contained vehicle copolymers according to this invention, were prepared according to the procedures described in Preparation Examples A to L. Copolymer solutions M and N used in Comparative Examples 1 to 3, which contained other vehicle copolymers, were prepared according to the procedures described in Preparation Examples M and N. All percents indicated hereunder are by weight.

PREPARATION EXAMPLE A

Toluene (100 g) was charged into a flask equipped with a stirrer and heated to 90° C. A mixture of triphenyltin methacrylate (20 g), methoxytetraethylene glycol methacrylate (80 g), methyl methacrylate (100 g) and benzoyl peroxide (4 g) was added dropwise to the toluene while stirring over a period of 2 hours. The resulting mixture was subsequently held at 90° C. for 3 hours, and after cooling, toluene (96 g) was added to form a copolymer solution A (solids content: 50%). The solution had a viscosity of 6.2 poises and the copolymer had a weight average molecular weight of 51,000.

PREPARATION EXAMPLE B

Xylene (84 g) was charged into a flask equipped with a stirrer and heated to 90° C. A mixture of tripropyltin methacrylate (40 g), methoxydiethylene glycol methacrylate (100 g), styrene (20 g), ethyl acrylate (40 g) and azobisisobutyronitrile (4 g) was added dropwise to the xylene while stirring over a period of 2 hours. Subsequently, the mixture was held at 90° C. for 30 minutes, and then heated to 110° C., at which temperature the mixture was held for 2 hours. After cooling, xylene (50 g) was added to form a copolymer solution B (solids content: 50%). The solution had a viscosity of 10.8 poises and the copolymer had a weight average molecular weight of 74,000.

PREPARATION EXAMPLE C

Xylene (120 g) was charged into a flask equipped with a stirrer and heated to 125° C. A mixture of tributyltin methacrylate (80 g), methoxydiethylene glycol methacrylate (40 g), methyl methacrylate (40 g), butyl methacrylate (40 g) and t-butyl peroxybenzoate (4 g) was added dropwise to the xylene while stirring over a period of 2.5 hours, and the resulting mixture was subsequently held at 125° C. for 3 hours. After cooling, toluene (76 g) was added to form a copolymer solution C (solids content: 50%). The solution had a viscosity of 2.8 poises and the copolymer had a weight average molecular weight of 32,000.

PREPARATION EXAMPLE D

Xylene (70 g) and butanol (30 g) were charged into a flask equipped with a stirrer and heated to 90° C. A mixture of tributyltin methacrylate (10 g), ethoxytripropyleneglycol methacrylate (140 g), methyl methacrylate (50 g) and benzoyl peroxide (4 g) was added dropwise to the mixture of xylene and butanol while stirring over a period of 2 hours, and subsequently, the resulting mixture was held at 90° C. for 3 hours. After cooling, xylene (96 g) was added to form a copolymer solution D (solids content: 50%). The solution had a viscosity of 4.9 poises and the copolymer had a weight average molecular weight of 44,000.

PREPARATION EXAMPLE E

Xylene (80 g) and butanol (80 g) were charged into a flask equipped with a stirrer and heated to 100° C. A mixture of methoxynonaethylene glycol methacrylate (60 g), methyl methacrylate (40 g), styrene (40 g), methacrylic acid (14 g) and benzoyl peroxide (4 g) was added dropwise to the mixture of xylene and butanol, and the resulting mixture was subsequently held at 100° C. for 3 hours. After cooling to 60° C., bis(tributyltin)oxide (48 g) and xylene (36 g) were added, and the mixture was held at 60° C. for 1 hour. Thereafter, the mixture was heated and water resulting from esterification was removed under refluxing. After confirming that the stoichiometric amount (0.35 g) of water had distilled off, the heating was stopped and the mixture was cooled to obtain a copolymer solution E (solids content: 50%). The solution had a viscosity of 3.9 poises and the copolymer had a weight average molecular weight of 36,000. IR spectrometry of the copolymer showed a C=O absorption for COOSnBu$_3$ group (Bu=butyl group) at 1635 cm$^{-1}$. Quantitative analysis on the basis of this absorption revealed the formation of the stoichiometic amount of COOSnBu$_3$ group.

PREPARATION EXAMPLE F

Xylene (100 g) was charged into a flask equipped with a stirrer and heated to 90° C. A mixture of diethylamyltin methacrylate (40 g), methoxytetraethylene glycol methacrylate (60 g), styrene (60 g), vinyl acetate (40 g), and t-butylperoxy-2-ethyl hexate (4 g) was added dropwise to the xylene over a period of 2 hours. Subsequently, the resulting mixture was held at 90° C. for 3 hours and thereafter cooled. By adding xylene (96 g) to the cooled mixture, a copolymer solution F (solids content: 50%) was obtained. The solution had a viscosity of 5.6 poises and the copolymer had a weight average molecular weight of 50,000.

PREPARATION EXAMPLE G

Butyl acetate (90 g) was charged into a flask equipped with a stirrer and heated at 126° C. while refluxing. A mixture of triphenyltin methacrylate (60 g), methoxyethyl methacrylate (140 g) and t-butylperoxy-2-ethyl hexate (8 g) was added dropwise to the butyl acetate over a period of 2.5 hours. Thereafter, the mixture was held at 126° C. while refluxing for 2.5 hours. After cooling, butyl acetate (106 g) was added to form a copolymer solution G (solid content: 50%). The solution had a viscosity of 2.0 poises and the copolymer had a weight average molecular weight of 26,000.

PREPARATION EXAMPLE H

Toluene (100 g) was charged into a flask equipped with a stirrer and heated to 90° C. A mixture of diethylamyltin methacrylate (30 g), acetoxydiethyleneglycol methacrylate (80 g), methyl methacrylate (50 g), ethyl acrylate (60 g) and benzoyl peroxide (4 g) was added dropwise to the toluene over a period of 2 hours. Thereafter, the resulting mixture was held at 90° C. for 3 hours and subsequently cooled. Toluene (96 g) was then added to form a copolymer solution H (solids content: 50%). The solution had a viscosity of 3.9 poises and the copolymer had a weight average molecular weight of 42,000.

PREPARATION EXAMPLE I

Copolymer solution I (solids content: 50%) was prepared by repeating the procedure in Preparation Example A, except that 20 g of triphenyltin methacrylate was replaced by 20 g of triphenyltin acrylate. This solution had a viscosity of 5.9 poises and the copolymer had a weight average molecular weight of 50,000.

PREPARATION EXAMPLE J

Copolymer solution J (solids content: 50%) was prepared by repeating the procedure in Preparation Example A, except that 80 g of methoxytetraethylene glycol methacrylate was replaced by 80 g of methoxytetraethylene glycol acrylate. This solution had a viscosity of 4.3 poises and the copolymer had a weight average molecular weight of 53,000.

PREPARATION EXAMPLE K

Butyl acetate (90 g) was charged into a flask equipped with a stirrer and heated at 126° C. while refluxing. A mixture of tributyltin methacrylate (50 g), methoxydiethylene glycol methacrylate (150 g) and t-butylperoxy-2-ethyl hexate (8 g) was added dropwise to the butyl acetate over a period of 2.5 hours. Thereafter, the resulting mixture was held at 126° C. while refluxing for an additional 2.5 hours. After cooling, butyl acetate (106 g) was added to form a copolymer solution K (solids content: 50%). The solution had a viscosity of 2.2 poises and the copolymer had a weight average molecular weight of 29,000.

PREPARATION EXAMPLE L

Xylene (90 g) was charged into a flask equipped with a stirrer and heated to 90° C. A mixture of triphenyltin acrylate (30 g), methoxytriethylene glycol methacrylate (170 g) and benzoyl peroxide (4 g) was added dropwise to the xylene over a period of 2.0 hours. Thereafter, the resulting mixture was held at 90° C. for 3 hours and cooled. By addition of xylene (106 g), a copolymer solution L (solids content: 50%) was obtained. The solution had a viscosity of 5.7 poises and the copolymer had a weight average molecular weight of 48,000.

PREPARATION EXAMPLE M

Xylene (100 g) was charged into a flask equipped with a stirrer and heated to 90° C. A mixture of tripropyltin methacrylate (120 g), ethyl acrylate (40 g), methyl methacrylate (40 g) and t-butylperoxy-2-ethyl hexate (4 g) was added dropwise to the xylene over a period of 3 hours. Thereafter, the resulting mixture was held at 90° C. for 2 hours and then cooled. By adding xylene (96 g), a copolymer solution M (solids content: 50%) was obtained. The solution had a viscosity of 5.8 poises and the copolymer had a weight average molecular weight of 52,000.

PREPARATION EXAMPLE N

Toluene (100 g) was charged into a flask equipped with a stirrer and heated to 90° C. A mixture of tributyltin methacrylate (60 g), methyl methacrylate (80 g), ethyl acrylate (20 g), butyl acrylate (40 g) and benzoyl peroxide (4 g) was added dropwise to the toluene over a period of 2 hours. Thereafter, the resulting mixture was held at 90° C. for 3 hours and cooled. By addition of toluene (96 g), a copolymer solution N (solids content: 50%) was obtained. The solution had a viscosity of 4.4 poises and the copolymer had a weight average molecular weight of 36,000.

EXAMPLES 1 to 17 AND COMPARATIVE EXAMPLES 1 to 3

The copolymer solutions, antifouling agents, pigments and additives shown in Table 1 were charged into an attritor and mixed under dispersion. Part of the solvents listed in Table 1 were added to the stirred mixture to adjust its viscosity in dispersion to a suitable value. Then, at a controlled dispersion temperature of 50° C. or less, the mixture was further dispersed for 1 hour until a particle size of 30 $\mu$m or less was obtained. Subsequently, the remaining part of the solvents was added and the mixtures were passed through a filter to thereby obtain antifouling paints for Examples 1 to 17 and Comparative Examples 1 to 3. The numerals in each column in Table 1 represent weight percent (wt %) values. Disparon 4300 mentioned as one of the two additives on the left side of Table 1 is the trademark for an antisag agent manufactured by Kusumoto Kasei K.K.

TABLE 1

| Materials Used | Example 1 | 2 | 3 | 4 | 5 | 6 | 7 | 8 | 9 | 10 | 11 | 12 | 13 | 14 | 15 | 16 | 17 | Comparative Example 1 | 2 | 3 |
|---|---|---|---|---|---|---|---|---|---|---|---|---|---|---|---|---|---|---|---|---|
| Copolymer Solution | | | | | | | | | | | | | | | | | | | | |
| A | 32.0 | — | — | — | — | — | — | — | — | — | — | — | — | — | — | — | — | — | — | — |
| B | — | 28.5 | — | — | — | — | — | — | — | — | — | — | — | — | — | — | — | — | — | — |
| C | — | — | 36.0 | — | — | — | — | — | — | — | — | — | — | — | — | — | — | — | — | — |
| D | — | — | — | 50.0 | — | — | — | — | — | — | — | — | — | — | — | — | — | — | — | — |
| E | — | — | — | — | 56.0 | — | — | — | — | — | — | — | — | — | — | — | — | — | — | — |
| F | — | — | — | — | — | 26.5 | — | — | — | — | — | — | — | — | — | — | — | — | — | — |
| G | — | — | — | — | — | — | 31.0 | — | — | — | — | — | — | — | — | — | — | — | — | — |
| H | — | — | — | — | — | — | — | 35.0 | — | — | — | — | — | — | — | — | — | — | — | — |
| I | — | — | — | — | — | — | — | — | 28.5 | — | — | — | — | — | — | — | — | — | — | — |
| J | — | — | — | — | — | — | — | — | — | 15.0 | 52.0 | — | — | — | — | — | — | — | — | — |
| K | — | — | — | — | — | — | — | — | — | — | — | 31.0 | 32.0 | — | — | — | — | — | — | — |
| L | — | — | — | — | — | — | — | — | — | — | — | — | — | 32.0 | 32.0 | — | — | — | — | — |
| M | — | — | — | — | — | — | — | — | — | — | — | — | — | — | — | 30.0 | — | — | — | — |
| N | — | — | — | — | — | — | — | — | — | — | — | — | — | — | — | — | 35.0 | 35.0 | 50.0 | 31.0 |
| Non-polymeric Antifouling Agent | | | | | | | | | | | | | | | | | | | | |
| Cuprous oxide | 47.0 | 50.0 | 43.0 | — | — | 53.5 | 49.0 | 21.0 | 50.0 | 48.0 | — | 49.0 | 47.0 | 47.0 | 50.0 | 45.0 | 48.0 | 45.0 | — | 49.0 |
| Cuprous thiocyanate | — | — | — | 23.0 | — | — | — | 18.0 | — | — | — | — | — | — | — | — | — | — | 23.0 | — |
| Zinc oxide | 6.0 | 4.5 | 6.0 | 2.0 | — | 2.0 | — | — | 4.5 | 3.0 | — | 2.0 | 6.0 | 6.0 | — | 5.0 | — | 5.0 | 2.0 | 2.0 |
| Triphenyl tin chloride | — | — | — | — | — | 4.0 | — | — | — | — | — | — | — | — | — | — | — | — | — | — |
| Pigment | | | | | | | | | | | | | | | | | | | | |
| Red oxide | 2.0 | 4.0 | 3.0 | — | 3.0 | 3.0 | 3.0 | — | 4.0 | 3.0 | 7.0 | 3.0 | 2.0 | 2.0 | 2.0 | 2.0 | 2.0 | 3.0 | — | 3.0 |
| Talc | — | — | 2.0 | 6.0 | 20.0 | — | 2.0 | 3.0 | — | — | 20.0 | 3.0 | — | — | 3.0 | 5.0 | 2.0 | — | 6.0 | 2.0 |
| Titanium dioxide | — | — | — | 3.0 | 2.0 | — | 2.0 | 4.0 | — | 2.0 | 3.0 | 2.0 | — | — | — | — | — | — | 3.0 | 2.0 |
| Phthalocyanine blue | — | — | — | 2.5 | — | — | — | 2.0 | — | — | — | — | — | — | — | — | — | — | 2.5 | — |
| Additive | | | | | | | | | | | | | | | | | | | | |
| Disparon 4300 | 1.0 | 1.0 | 1.0 | 1.0 | 1.0 | 1.0 | 1.0 | 1.0 | 1.0 | 1.0 | 1.5 | 1.0 | 1.0 | 1.0 | 1.0 | 1.0 | 1.0 | 1.0 | 1.0 | 1.0 |
| Tricresyl phosphate | — | — | — | — | — | — | 2.0 | — | — | — | — | — | — | — | — | — | — | — | — | — |
| Solvent | | | | | | | | | | | | | | | | | | | | |
| Xylene | 12.0 | 10.0 | 9.0 | 10.0 | 18.0 | 10.0 | 10.0 | 14.0 | 12.0 | 10.0 | 10.0 | 10.0 | 12.0 | 12.0 | 12.0 | 12.0 | 12.0 | 11.0 | 10.0 | 10.0 |
| Methyl isobutyl ketone | — | 2.0 | — | 2.5 | — | — | — | 2.0 | — | — | — | — | — | — | — | — | — | — | 2.5 | — |
| Butyl acetate | — | — | — | — | — | — | — | — | — | 3.0 | 6.5 | — | — | — | — | — | — | — | — | — |
| Total | 100 | 100 | 100 | 100 | 100 | 100 | 100 | 100 | 100 | 100 | 100 | 100 | 100 | 100 | 100 | 100 | 100 | 100 | 100 | 100 |

The performance of the antifouling paints prepared in Examples 1 to 17 and Comparative Examples 1 to 3 was examined by subjecting them to the following rotary test and simulation test.

1. Rotary test

Sand blasted steel sheets (100×100×0.8 mm) were given a single coat of etching primer in a thickness of 5 μm, two coats of tar vinyl ship bottom anticorrosive paint each having a thickness of 70 μm, and two coats, each in a thickness of 60 μm, of the antifouling paints of the respective Examples and Comparative Examples. Each of the thus prepared test plates was attached to a rotary drum submerged in seawater which was rotated for 6 months at a relative seawater speed of 16 knots. The thickness of the paint film that wore during the test period was averaged for the six months to evaluate the self-polishing property of each antifouling paint sample. The results are shown in Table 2.

2. Simulation test

Sand blasted steel sheets (100×100×0.8 mm) were given two coats of a tar epoxy primer anticorrosive paint, each in a thickness of 125 μm, a single coat of tar vinyl sealer in a thickness of 70 μm, and two coats, each in a thickness of 100 μm, of the antifouling paints of the respective Examples and Comparative Examples. Each of the thus prepared test plates was subjected to a simulation test (ship movement simulation test) repeating cycles each consisting of one-month rotary test (see above) and one-month submerging in seawater to a depth of 1.5 m. The antifouling effect of the tested coats after each cycle was evaluated by the rate of fouling area. The results are shown in Table 3.

TABLE 2

|  |  | Wear of paint film (μm/month) |
|---|---|---|
| Example | 1 | 5 |
| " | 2 | 8 |
| " | 3 | 15 |
| " | 4 | 12 |
| " | 5 | 11 |
| " | 6 | 3 |
| " | 7 | 7 |
| " | 8 | 8 |
| " | 9 | 6 |
| " | 10 | 6 |
| " | 11 | 12 |
| " | 12 | 18 |
| " | 13 | 6 |
| " | 14 | 4 |
| " | 15 | 8 |
| " | 16 | 9 |
| " | 17 | 5 |
| Comparative Example | 1 | 12 |
| Comparative Example | 2 | 0 |
| Comparative Example | 3 | 0 |

TABLE 3

|  | Rate of Fouling Area (%) Number of Cycles | | | | | | | | | | | |
|---|---|---|---|---|---|---|---|---|---|---|---|---|
|  | 1 | 2 | 3 | 4 | 5 | 6 | 7 | 8 | 9 | 10 | 11 | 12 |
| Example 1 | 0 | 0 | 0 | 0 | 0 | 0 | 0 | 0 | 0 | 0 | 0 | 0 |
| Example 2 | 0 | 0 | 0 | 0 | 0 | 0 | 0 | 0 | 0 | 0 | 0 | 0 |
| Example 3 | 0 | 0 | 0 | 0 | 0 | 0 | 0 | 0 | 0 | 0 | 0 | 0 |
| Example 4 | 0 | 0 | 0 | 0 | 0 | 0 | 0 | 0 | 0 | 0 | 0 | 0 |
| Example 5 | 0 | 0 | 0 | 0 | 0 | 0 | 0 | 0 | 0 | 0 | 0 | 0 |
| Example 6 | 0 | 0 | 0 | 0 | 0 | 0 | 0 | 0 | 0 | 0 | 0 | 0 |
| Example 7 | 0 | 0 | 0 | 0 | 0 | 0 | 0 | 0 | 0 | 0 | 0 | 0 |
| Example 8 | 0 | 0 | 0 | 0 | 0 | 0 | 0 | 0 | 0 | 0 | 0 | 0 |
| Example 9 | 0 | 0 | 0 | 0 | 0 | 0 | 0 | 0 | 0 | 0 | 0 | 0 |
| Example 10 | 0 | 0 | 0 | 0 | 0 | 0 | 0 | 0 | 0 | 0 | 0 | 0 |
| Example 11 | 0 | 0 | 0 | 0 | 0 | 0 | 0 | 0 | 0 | 0 | 0 | 0 |
| Example 12 | 0 | 0 | 0 | 0 | 0 | 0 | 0 | 0 | 0 | 0 | 0 | 0 |
| Example 13 | 0 | 0 | 0 | 0 | 0 | 0 | 0 | 0 | 0 | 0 | 0 | 0 |
| Example 14 | 0 | 0 | 0 | 0 | 0 | 0 | 0 | 0 | 0 | 0 | 0 | 0 |
| Example 15 | 0 | 0 | 0 | 0 | 0 | 0 | 0 | 0 | 0 | 0 | 0 | 0 |
| Example 16 | 0 | 0 | 0 | 0 | 0 | 0 | 0 | 0 | 0 | 0 | 0 | 0 |
| Example 17 | 0 | 0 | 0 | 0 | 0 | 0 | 0 | 0 | 0 | 0 | 0 | 0 |
| Comparative Example 1 | 0 | 0 | 0 | 0 | 0 | 0 | 0 | 0 | 0 | 0 | 0 | 0 |
| Comparative Example 2 | 0 | 5 | 15 | 30 | 90 | 100 | 100 | 100 | 100 | 100 | 100 | 100 |
| Comparative Example 3 | 0 | 0 | 5 | 10 | 10 | 20 | 30 | 50 | 50 | 80 | 90 | 90 |

As can be seen from the above test results, the existing self-polishing type antifouling paints prepared in Comparative Examples 2 and 3 using small amounts of trialkyltin ester (substantially similar results would be obtained if the alkyl group was replaced by a phenyl group) in vehicle copolymers produced coatings that had undesirably low self-polishing and antifouling effects. Some of the antifouling paints prepared according to the present invention contained smaller amounts of trialkyltin ester (substantially similar results would be obtained if the alkyl group was replaced by a phenyl group) in the vehicle copolymers, but they provided coatings having self-polishing and antifouling effects equivalent to those exhibited by the other existing self-polishing type antifouling paints (Comparative Example 1) that contained an uneconomically large amount of trialkyltin ester (substantially similar results would be obtained if the alkyl group was replaced by a phenyl group) in the vehicle copolymer. As another advantage, the antifouling paint according to the present invention permits easy adjustment of the self-polishing property of its coat.

While the invention has been described in detail and with reference to specific embodiments thereof, it will be apparent to one skilled in the art that various changes and modifications can be made therein without departing from the spirit and scope thereof.

What is claimed is:

1. An antifouling paint containing as a vehicle a copolymer comprising units (a) and (b)

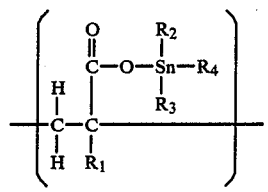
(a)

wherein $R_1$ represents a hydrogen atom or a methyl group, and $R_2$, $R_3$, $R_4$ each represents an alkyl group having from 1 to 8 carbon atoms or a phenyl group,

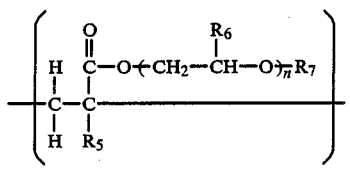
(b)

wherein $R_5$ and $R_6$ each represents hydrogen atom or a methyl group, $R_7$ represents an alkyl group having from 1 to 4 carbon atoms or an acyl group, and n is a positive number from 1 to 30, wherein the average total weight of unit (b) per molecule is at least 5 wt. %, said copolymer containing from 1 wt % to 50 wt % unit (a), and said paint further containing from 0 to 80 wt % of a non-polymeric antifouling agent.

2. An antifouling paint according to claim 1, wherein said copolymer comprises from 1 to 45 wt % of unit (a), from 5 to 99.9 wt % of unit (b), and from 0 to 80 wt % of unit (c) which differs from units (a) and (b), wherein the wt % values indicate the average total weights of the respective units per molecule, and the sum of the average total weights of the respective units (a), (b) and (c) is 100 wt %.

3. An antifouling paint according to claim 1, wherein $R_7$ in unit (b) represents a methyl, ethyl, or acyl group.

4. An antifouling paint according to claim 2, wherein $R_7$ in unit (b) represents a methyl, ethyl, or acyl group.

5. An antifouling paint according to claim 1, wherein $R_6$ in unit (b) is a hydrogen atom.

6. An antifouling paint according to claim 2, wherein $R_6$ in unit (b) represents a hydrogen atom.

7. An antifouling paint according to claim 3, wherein $R_6$ in unit (b) represents a hydrogen atom.

8. An antifouling paint according to claim 4, wherein $R_6$ in unit (b) represents a hydrogen atom.

9. A terpolymer comprising units of the following monomers:

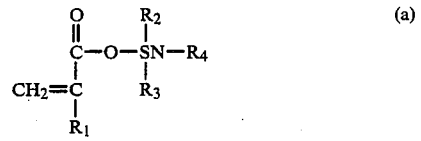
(a)

wherein $R_1$ represents a hydrogen atom or a methyl group, and $R_2$, $R_3$, and $R_4$ each represents an alkyl group having from 1 to 8 carbon atoms or a phenyl group,

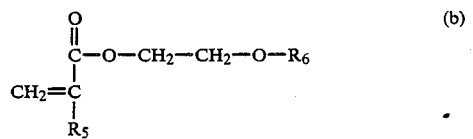
(b)

wherein $R_5$ represents a hydrogen atom or a methyl group and $R_6$ represents a methyl or ethyl group; and (c) a monomer selected from the group consisting of methyl metacrylate, ethyl methacrylate, propyl methacrylate, butyl metacrylate, and isobutyl metacrylate, wherein the average weight unit of (b) per molecule is at least 5 weight percent, and said terpolymer contains from 1 wt % to 50 wt % of unit (a).

10. An antifouling paint comprising the terpolymer of claim 9.

* * * * *